Sept. 26, 1950   P. M. CLAYTON   2,523,611
MANIFOLD HEATING SYSTEM
Filed June 4, 1949   2 Sheets-Sheet 1
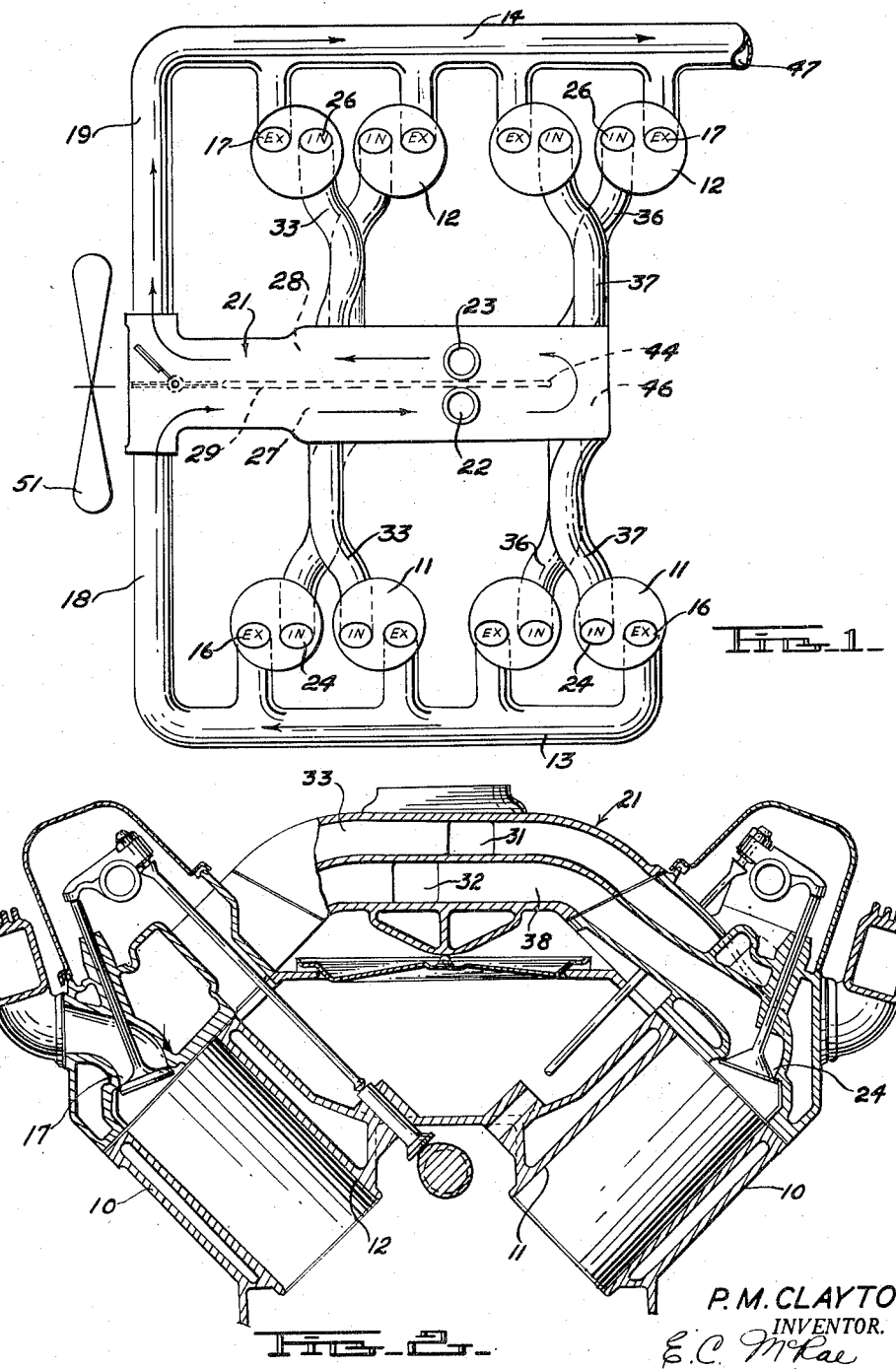
P. M. CLAYTON
INVENTOR.
BY E. C. McRae
J. R. Faulkner
T. H. Oster
ATTORNEYS Sept. 26, 1950      P. M. CLAYTON      2,523,611
MANIFOLD HEATING SYSTEM Filed June 4, 1949      2 Sheets-Sheet 2

P. M. CLAYTON
INVENTOR.

BY E. C. McRae
J. R. Faulkner
T. H. Oster

ATTORNEYS

Patented Sept. 26, 1950

2,523,611

UNITED STATES PATENT OFFICE 2,523,611

MANIFOLD HEATING SYSTEM

Paul M. Clayton, Detroit, Mich., assignor to Ford Motor Company, Dearborn, Mich., a corporation of Delaware Application June 4, 1949, Serial No. 97,215

10 Claims. (Cl. 123—122)

This invention relates generally to an internal combustion engine, and more particularly to a manifold heating system whereby the gaseous fuel used in the engine can be heated during its passage through the intake manifold of the engine, and comprises an improvement over the system shown in Patent 1,998,636.

The manifold construction of the present invention is particularly adapted for use on V-type engines having two exhaust manifolds, one extending along the outer side of each bank of cylinders, and an intake manifold located intermediate the two banks of cylinders. It has previously been customary to preheat such an intake manifold by providing a heating chamber around its central portion and connecting this heating chamber with intermediate portions of the two exhaust manifolds so that an alternate or cross flow of exhaust gases through the heating chamber provides heat for the intake manifold. In Patent 1,998,636 mentioned above, provision was made for such a cross flow, and in addition the forward ends of the two exhaust manifolds were interconnected by a conduit leading to the exhaust outlet and containing a thermostatically controlled valve enabling the conduit to be closed so that all exhaust gases from one exhaust manifold would be forced through the cross-over when additional heating was required. This valve was responsive to both engine temperature and the surrounding air temperature and opened when the temperatures were sufficiently high to insure proper operation. Even when open, however, the cross-over between the two exhaust manifolds provided a certain amount of heating of the intake manifold.

In the manifold heating system of the present invention, the intermediate cross-over between the exhaust manifolds is eliminated. Instead, the forward ends of the two manifolds are interconnected by a conduit which in turn communicates with the forward portion of the heating chamber for the intake manifold, located between the two banks of cylinders. The intake manifold is formed with passageways providing a complete circuit and enabling gases from the conduit interconnecting the two exhaust manifolds to be circulated completely around the intake passages of the intake manifold and then returned to the conduit. At the junction between the exhaust conduit and the heating chamber for the intake manifold, a butterfly type valve is provided. This valve may be turned through an angle of 90 degrees, and in one extreme position blocks the entrance to the heating chamber for the intake manifold, and in the other extreme position directs all of the exhaust gases from one intake manifold through the heating chamber for the intake manifold, thereafter returning them to the exhaust conduit and then through the other exhaust manifold to the outlet.

The control valve of the present invention is biased by a bimetal thermostatic spring located exteriorly of the manifold but closely adjacent thereto so as to be responsive to the manifold temperature as well as the temperature of the surrounding air. In addition, the valve is made responsive to engine speed by providing a vane on the valve shaft in the path of air from the engine fan, so that at high engine speed the resulting high air velocity will act upon the vane and exert a force thereon tending to move the valve to a position blocking the entrance to the intake manifold heating chamber and thus by-passing the latter. This arrangement is desirable since manifold heating is particularly needed at lower engine speeds when the vaporization of the fuel is incomplete, but is unnecessary at high speeds and might result in overheating which would reduce the volumetric efficiency of the engine.

A further advantage of the present construction resides in the fact that it may be economically constructed since the heating chamber may be formed integrally with the intake manifold, and the usual intermediate cross-over is eliminated. The elimination of the conventional intermediate cross-over is also advantageous from the standpoint of efficient engine operation since there are certain conditions under which it is desirable to eliminate all intake manifold heating, and this cannot be done with the cross-over system since a certain amount of cross-flow and consequent manifold heating occurs at all times. Furthermore, the normal overlap of exhaust valve operation results, with the cross-over system, in directing the exhaust from certain cylinders into other cylinders at inopportune times, thus impairing engine efficiency.

Other objects and advantages of the present invention will be made more apparent as this description proceeds, particularly when considered in connection with the accompanying drawings, wherein:

Figure 1 is a schematic plan view of a V-type 8-cylinder engine illustrating diagrammatically the manifold heating system of the present invention.

Figure 2 is a transverse cross-sectional view of a V-8 engine, illustrating a part of the manifolding.

Figure 3:
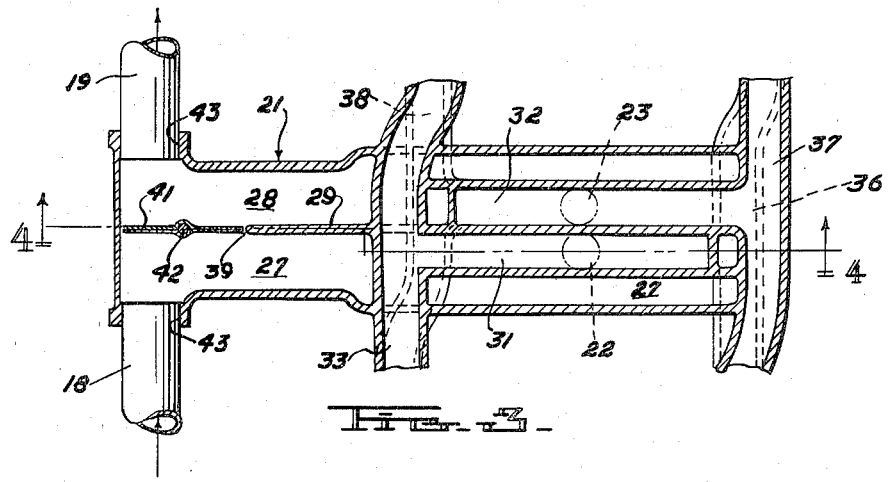
Figure 3 is a horizontal cross-sectional view through the intake manifold, taken substantially on the plane indicated by the line 3—3 of Figure 4, and showing the intake manifold heating chamber, part of the inter-connecting exhaust conduit, and the control valve therefor.

Referring now to the drawings, and particularly to Figures 1 and 2, the reference character 10 indicates the cylinder block of a V-8 engine of the overhead valve type. The engine forms no part of the present invention and is shown and will be discussed only generally. The cylinder block comprises two banks of four cylinders each disposed at a 90 degree angle to each other. The cylinders in the left bank are designated by the reference character 11 and those in the right bank by the numeral 12. A pair of exhaust manifolds 13 and 14 are provided for the cylinders 11 and 12, respectively, being mounted upon the outer sides of the cylinder block. As shown in Figure 1, the exhaust manifold 13 is connected to the exhaust ports 16 associated with the cylinders 11 in the left bank, while the exhaust manifold 14 is connected to the exhaust ports 17 for the cylinders 12 in the right bank. The forward ends of the exhaust manifolds 13 and 14 communicate with exhaust conduits 18 and 19, respectively, which extend inwardly toward each other and communicate with the forward portion of the intake manifold casting 21.

The intake manifold casting 21 is centrally located between the two banks of cylinders 11 and 12 respectively, and has passageways therein establishing communication between the vertical risers 22 and 23 from the carburetor (not shown) and the intake ports 24 and 26 for the cylinders 11 and 12, respectively. In addition, the intake manifold casting 21 is integrally formed with a heating chamber partially surrounding the fuel passages. As shown diagrammatically in Figure 1, the heating chamber comprises passageways 27 and 28 located on opposite sides of a central baffle wall 29.

Figure 4:
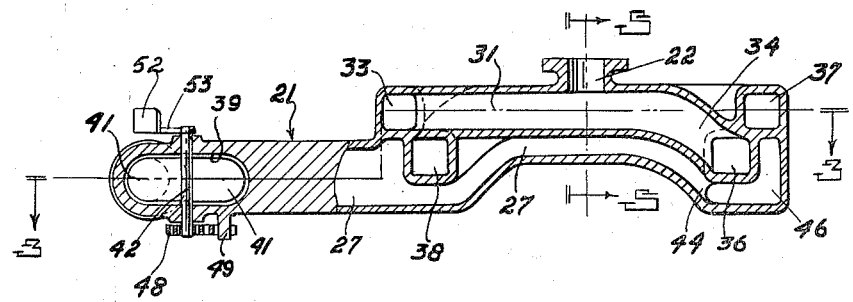
Figure 4 is a vertical cross-sectional view, taken substantially on the plane indicated by the line 4—4 of Figure 3.
Figure 5:
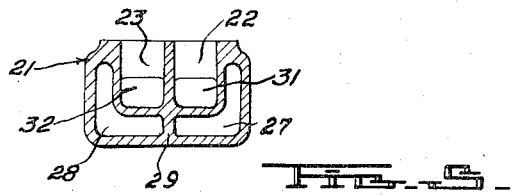
Figure 5 is a transverse cross-sectional view taken substantially on the plane indicated by the line 5—5 of Figure 4.

Reference is now made to Figures 3, 4 and 5 for a more detailed description of the intake manifold casting 21 and the intake and heating passages therein. As shown, the intake manifold casting 21 is formed with longitudinally extending left and right intake runners 31 and 32 communicating with the risers 22 and 23, respectively, from the carburetor. At its forward end the left intake runner communicates with the transverse passageway 33 communicating with intake ports 24 and 26 for the cylinders in the left and right banks of cylinders. At its rearward end the left intake runner 31 inclines downwardly as at 34, and communicates with a transversely extending passageway 36, similarly communicating with a pair of intake ports in the two banks of cylinders. The construction of the right intake runner 32 is similar but reversed, communicating with the transverse intake passageway 37 at its rearward end and being inclined downwardly at its forward end to communicate with a transverse passageway 38. Each end of each of the passageways 37 and 38 communicates with an intake port.

As mentioned above, the intake manifold casting 21 is longitudinally divided by a baffle wall 29 into left and right heating chambers 27 and 28. As best seen in Figure 4, an elongated opening 39 is provided in the forward portion of the baffle wall 29. A butterfly type valve 41 substantially closes the opening 39 and is mounted for pivotal movement about the vertical valve shaft 42, the upper end lower ends of which are journaled in the upper and lower walls of the manifold casting 21.

Cylindrical openings 43 are provided at opposite sides of the forward portion of the manifold casting 21 for receiving the ends of the conduits 18 and 19 extending from the left and right exhaust manifolds 13 and 14, respectively. It will be seen that with the butterfly valve 41 in the position shown in Figures 1 and 3, all of the exhaust gases from the left exhaust manifold 13 and the manifold conduit 18 are diverted into the heating chamber 27. The heating chamber 27 passes beneath the transverse intake passageways 33 and 38 and then extends rearwardly beneath and at the outer side of the left intake runner 31. The shape of the heating chamber 27 adjacent the intake runner is L-shaped as shown in Figure 5. The longitudinally extending baffle wall 29 terminates at its rearward end 44 beneath the transverse passageway 36. At this point the left heating chamber 27 communicates with a short transversely extending heating chamber 46 extending beneath the transverse intake passageways 36 and 37, and the heating chamber 46 in turn communicates with the rearward end of the right heating chamber 28. The heating chamber 28 extends forwardly beneath and at the outer side of the right intake runner 32 and finally passes beneath the transverse intake passageways 33 and 38. At its forward end the right heating chamber 28 communicates with the exhaust conduit 19 leading to the forward end of the right exhaust manifold 14. The exhaust gases from the left intake manifold 13 thus joint those in the right exhaust manifold 14 and pass together from the exhaust outlet 47 into a conventional muffler (not shown).

It will be seen from the foregoing that the heating chambers 27, 46 and 28, cooperating with the baffle wall 29, provide a complete circuit for the exhaust gases from the exhaust conduit 18 completely around the intake manifold casting 21 in close contact with the various intake passages. During their passage through these heating chambers, the exhaust gases effectively heat the gaseous fuel in the intake manifold.

Figures 6, 7:
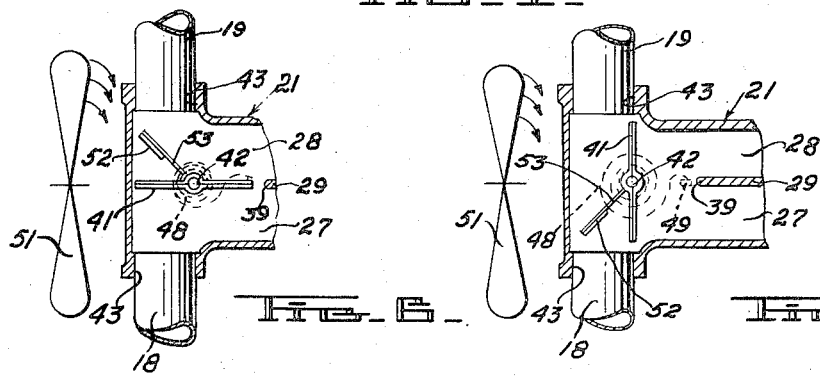
Figure 6 is a semi-diagrammatic view similar to a portion of Figure 3 and showing the control valve in position to divert substantially all of the exhaust from one exhaust manifold through the heating chamber for the intake manifold.
Figure 7 is a semi-diagrammatic view similar to Figure 6, but showing the control valve in the other extreme position, with the exhaust gases by-passing the heating chamber for the intake manifold and passing directly to the opposite exhaust manifold.

The butterfly valve 41 is adapted to be moved from the position shown in Figures 1, 3 and 6 in a counterclockwise direction through an angle of 90 degrees to the position shown in Figure 7. A conventional bimetal thermostatic element 48 is connected between the lower end of the valve shaft 42 and a stop 49 depending downwardly from the bottom of the intake manifold casting 21. The bimetallic element 48 is in the form of a helix, normally biasing the valve 41 in a clockwise direction, so that when the thermostatic element is cold the valve assumes the position shown in Figure 6. Thus, when starting a cold engine, all of the exhaust gases are diverted through the heating chambers surrounding the intake manifold to heat the fuel therein. As the engine heats up the bimetallic element 48 gradually moves the valve toward the position shown in Figure 7 in which the exhaust gases by-pass the intake manifold heating chamber. Inasmuch as the bimetallic element is located in back of the engine fan 51, operation of the valve is also affected by the air temperature. In winter, therefore, the valve 41 remains in a position diverting at least a part of the exhaust gas through the heating chamber for a longer period of time than in warmer weather.

In addition to thus being responsive to both engine temperature and air temperature, the control valve 41 is also responsive to engine speed. This control is effected by means of a flat vane 52 which is provided at the outer end of an arm 53, the latter in turn being mounted on the upper end of the valve shaft 42. Referring now to Figures 6 and 7, it will be seen that the arm 53 and vane 52 are mounted upon the valve shaft 42 at approximately a 45 degree angle with the butterfly valve 41. When the valve is in the position shown in Figure 6 to heat the gases in the intake manifold, the vane 52 is acted upon by the air stream from the top of the fan blade 51 which is driven by the engine and is rotating in a counterclockwise direction as viewed from a position rearwardly of the fan. The air stream thus tends to turn the wind vane and arm in a counterclockwise direction and consequently tends to move the control valve 41 from the heating position shown in Figure 6 to the by-pass position shown in Figure 7. Since the velocity of the air stream is greater at high engine speeds, the vane biases the valve 41 toward the by-pass position at high speed. A further factor in augmenting the biasing of the control valve toward the by-pass position at high speed is the fact that the vane 52 occupies a position more nearly at right angles to the air stream when the valve is in a partially closed position than it does when the valve is in the position shown in Figure 6, which position it occupies when the engine is cold. The air velocity is therefore ineffective to move the valve to a by-passing position until the engine has become sufficiently heated to insure proper vaporization of the fuel in the intake manifold.

From the foregoing description, it will be seen that I have provided a manifold heating system in which all of the exhaust gases from one bank of cylinders can be passed through a heat chamber surrounding the intake manifold to effectively heat the latter when necessary, in which all of the gases from this bank of cylinders can be by-passed past the entrance to the heating chamber so that under certain circumstances the intake manifold will not be heated at all, and in which various adjusted positions between these two extremes can be obtained so that the exhaust gases from the one bank of cylinders can be proportioned between the path through the heating chamber and the direct path to the exhaust outlet. Moreover, the control of the valve effecting the path of the exhaust gases from the one exhaust manifold is automatically effected in accordance with the engine temperature, the air temperature, and the engine speed. A full range of control is therefore obtained which is not achieved by other manifold heating systems, and the control can thus be made responsive to all of the conditions having a bearing upon the desirable amount of heat for the intake manifold so that the most efficient operation of the engine can be obtained.

It will be understood that the invention is not to be limited to the exact construction shown and described, but that various changes and modifications may be made without departing from the spirit and scope of the invention, as defined in the appended claims.

What is claimed is:

1. In an internal combustion engine of the V-type having an exhaust manifold extending along the outer side of each bank of cylinders and an intake manifold intermediate the two banks of cylinders, a conduit extending from one end of one of said exhaust manifolds to the corresponding end of the other exhaust manifold and forming the sole exit for the exhaust gases from said first exhaust manifold, an exhaust outlet leading from said second exhaust manifold, a heating chamber adjacent said intake manifold and communicating with said conduit, and a valve between said conduit and said heating chamber arranged to selectively direct exhaust gases from said first exhaust manifold through said heating chamber and to redirect them to said conduit for transmission to said second exhaust manifold.

2. In an internal combustion engine of the V-type having an exhaust manifold extending along the outer side of each bank of cylinders and an intake manifold intermediate the two banks of cylinders, a conduit extending from one end of one of said exhaust manifolds to the corresponding end of the other exhaust manifold and forming the sole exit for the exhaust gases from said first exhaust manifold, an exhaust outlet leading from said second exhaust manifold, a heating chamber adjacent said intake manifold and communicating with said conduit, a valve between said conduit and said heating chamber movable between a position directing substantially all of the exhaust gases from said first exaust manifold through said second heating chamber prior to being transmitted to said second exhaust manifold and a second position directing substantially all of the exhaust gases from said first exhaust manifold directly to said second exhaust manifold and by-passing said heating chamber.

3. The structure defined by claim 2 which is further characterized in that the movement of said valve between the aforementioned positions is made dependent upon engine temperature and the temperature of the surrounding air by means of a bimetal thermostatic element arranged to control said valve and located exteriorly of said exhaust conduit and said heating chamber but closely adjacent thereto, and a wind vane mounted in the path of the air stream from the engine fan and arranged to effect the movement of said valve to render the position of the latter also dependent upon engine speed.

4. In an internal combustion engine of the V-type having an exhaust manifold extending along the outer side of each bank of cylinders and an intake manifold intermediate the two banks of cylinders, a transverse conduit extending from the forward end of one of said exhaust manifolds to the forward end of the other exhaust manifold and forming the sole exit for the exhaust gases from said first exhaust manifold, an exhaust outlet leading from the rearward end of said second exhaust manifold, said intake manifold having a plurality of passageways for the transmission of fuel to said cylinders and a heating chamber surrounding a portion of said fuel passageways, the forward portion of said heating chamber communicating with an intermediate portion of the exhaust conduit extending between the forward ends of said exhaust manifolds, a longitudinally extending baffle wall in said heating chamber dividing the latter into two sections with said wall terminating short of the rearward end of said heating chamber so that the rearward portions of said heating chamber sections are in communication with each other, a butterfly type valve located in the zone of communication between said heating chamber and said exhaust conduit and being rotatable between a position directing substantially all of the exhaust gases from said first exhaust manifold into the forward portion of one of said heating chamber sections and redirecting the exhaust gases in the forward portion of the other heating chamber section into said exhaust conduit for transmission to said second exhaust manifold and a position directing substantially all of the exhaust gases from the first exhaust manifold directly to said second exhaust manifold without passing said gases through said heating chamber section.

5. In an internal combustion engine of the V-type having an exhaust manifold extending along the outer side of each bank of cylinders and an intake manifold intermediate the two banks of cylinders, a transverse conduit extending from the forward end of one of said exhaust manifolds to the forward end of the other exhaust manifold and forming the sole exit for the exhaust gases from said first exhaust manifold, an exhaust outlet leading from the rearward end of said second exhaust manifold, said intake manifold having a pair of longitudinally extending runners communicating with transversely extending passageways at their opposite ends which in turn communicate with the cylinders in said two banks, a heating chamber passing beneath said transversely extending intake passageways and along the bottom and outer sides of said intake runners and communicating at its forward end with an intermediate portion of the exhaust conduit between said exhaust manifolds, a longitudinally extending wall dividing said heating chamber into two sections, said wall terminating short of the rearward end of said heating chamber to provide communication between said two sections at their rearward ends to form a continuous path for exhaust gases through said sections, said wall also having an opening formed in its forward portion, a butterfly type valve rotatably mounted in said opening and adapted in one position to substantially close said opening to direct substantially all of the exhaust gases from said first-mentioned exhaust manifold serially through said heating chamber sections to heat the fuel in said intake manifold runners and transverse passageways and to direct the exhaust gases leaving said heating chamber into said exhaust conduit for transmission to said second exhaust manifold and then to said exhaust outlet, and a bimetal thermostatic element arranged to control said butterfly valve and upon being heated to rotate said valve to permit a portion of the exhaust gases from said first exhaust manifold to pass directly to said second exhaust manifold without traveling through said heating chamber.

6. The structure defined by claim 5 which is further characterized in that said bimetal thermostatic element is in the form of a helix arranged to bias said butterfly valve to the position closing the opening in said wall when the element is cold and to rotate said valve toward its open position when subjected to heat, said bimetal thermostatic element being mounted exteriorly of said exhaust conduit and said heating chamber and thus responsive to the temperature of the surrounding air but located closely adjacent to said exhaust conduit and heating chamber to be also responsive to the heat therefrom.

7. In an internal combustion engine of the V-type having an exhaust manifold extending along the outer side of each bank of cylinders and an intake manifold intermediate the two banks of cylinders with the engine fan being located centrally between said two banks of cylinders and forwardly of said intake manifold, an exhaust conduit extending from the forward end of one of said exhaust manifolds to the forward end of the other exhaust manifold and forming the sole exit for the exhaust gases from said first exhaust manifold, an exhaust outlet leading from the rearward end of said second exhaust manifold, said intake manifold having a plurality of fuel passageways therein, a heating chamber adjacent a portion of the fuel passageways in said intake manifold and extending forwardly therefrom and communicating with said exhaust conduit, a butterfly type valve controlling communication between said exhaust conduit and said heating chamber and mounted upon a vertical shaft for rotary movement, an arm mounted upon the upper end of said shaft, a wind vane carried by said arm in position to be acted upon by the air stream from the engine fan and tending, under the action of said air stream, to rotate said valve toward the position by-passing said heating chamber and directing said exhaust gases directly from the first exhaust manifold to the second exhaust manifold.

8. The structure defined by claim 7 which is further characterized in that said arm and said vane are mounted at an acute angle to the valve and are located substantially in alignment with the upper portion of said engine fan.

9. The structure defined by claim 7 which is further characterized in that said valve is rotatable from a longitudinal position directing the exhaust gases through the heating chamber to a transverse position by-passing the heating chamber and the arm and wind vane are mounted upon the valve shaft at an acute angle to the valve so that the arm and vane are movable from a position extending diagonally forwardly on one side of a longitudinal plane extending through the valve shaft to a position extending diagonally forwardly on the opposite side of said longitudinal plane with the extreme positions of said arm and vane being symmetrically located with respect to said plane.

10. In an internal combustion engine of the V-type having an exhaust manifold extending along the outer side of each bank of cylinders and an intake manifold intermediate the two banks of cylinders, a transverse conduit extending from the forward end of one of said exhaust manifolds to the forward end of the other exhaust manifold and forming the sole exit for the exhaust gases from said first exhaust manifold, an exhaust outlet leading from the rearward end of said second exhaust manifold, a heating chamber adjacent said intake manifold having a U-shaped passageway with the open ends of the legs of the U communicating with said transverse conduit, and valve means between said transverse conduit and said U-shaped passageway.

PAUL M. CLAYTON.

No references cited.